Sept. 8, 1936.  R. H. WHITEHEAD ET AL  2,053,859
TIMING SWITCH
Filed Dec. 31, 1931   2 Sheets-Sheet 1
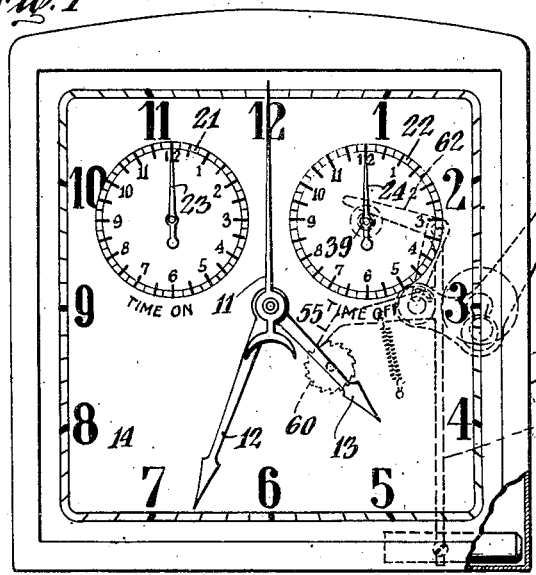
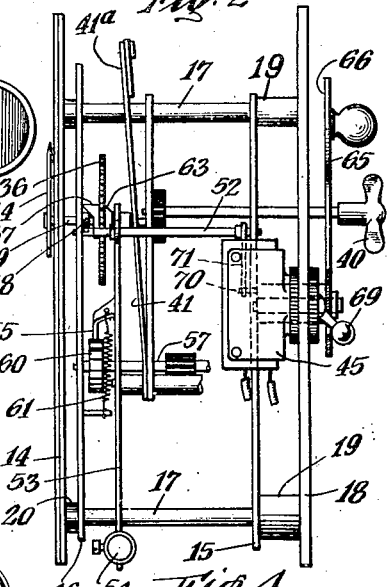
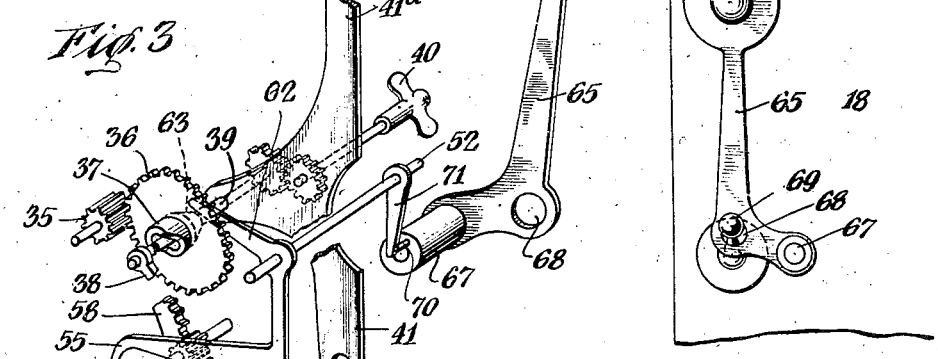
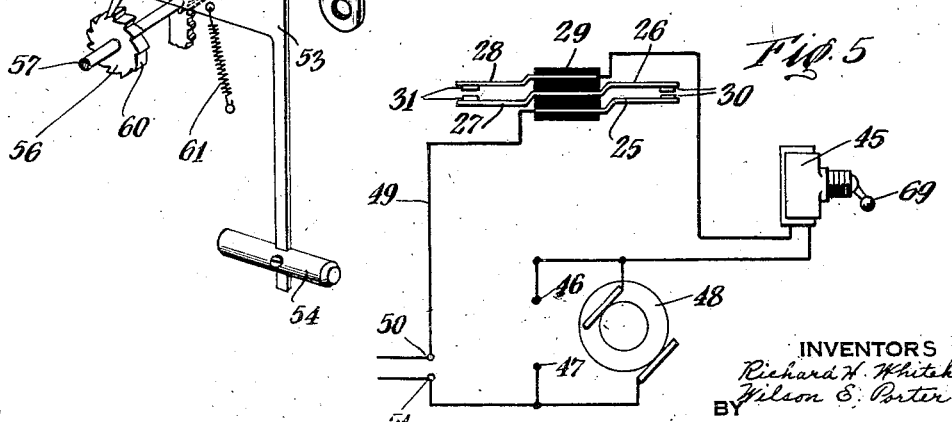
INVENTORS
Richard H. Whitehead
Wilson E. Porter
BY
Watson, Bristol, Johnson, Leavinworth
ATTORNEYS

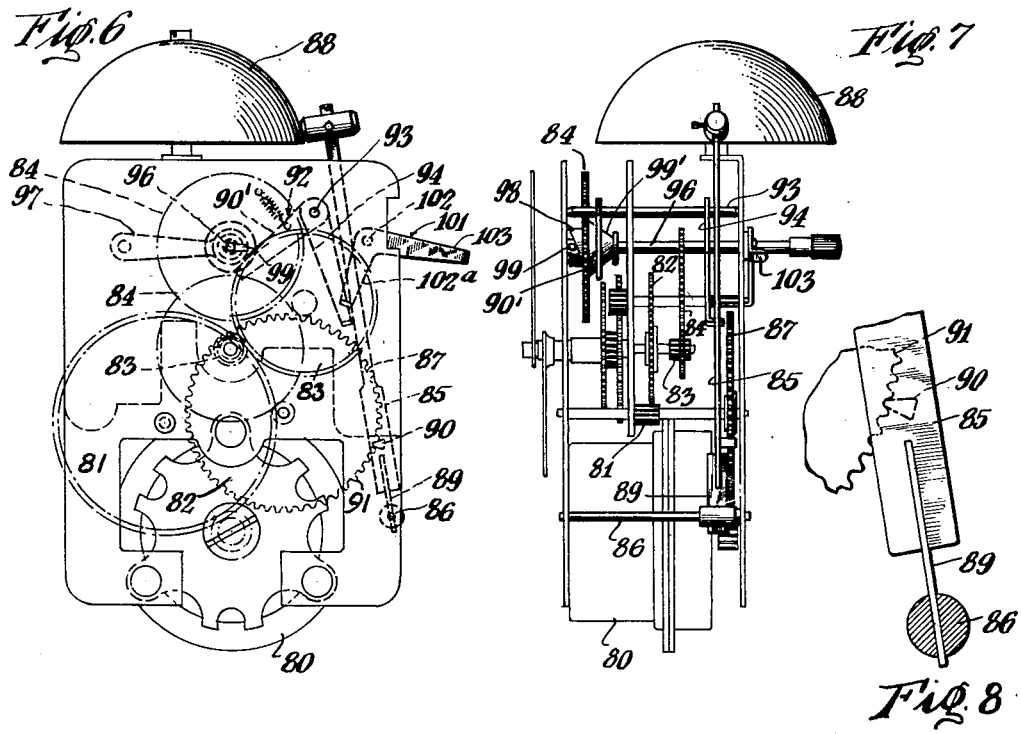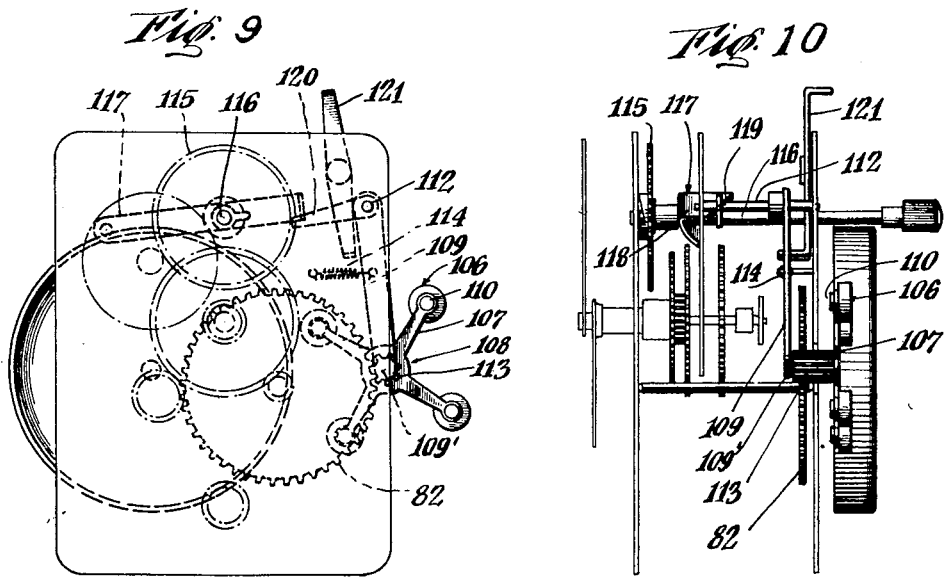

Patented Sept. 8, 1936

2,053,859

UNITED STATES PATENT OFFICE 2,053,859

TIMING SWITCH

Richard H. Whitehead and Wilson E. Porter, New Haven, Conn., assignors to The New Haven Clock Company, New Haven, Conn., a corporation of Connecticut Application December 31, 1931, Serial No. 584,042

9 Claims. (Cl. 161—1)

This invention relates to control instrumentalities for controlling power devices such as electric or gas ranges or the like. It is adapted more specifically for automatically turning such devices on and off at predeterminable future times. In the specific embodiment illustrated it operates to control an electric current but it may be used with or without auxiliary apparatus such as relays or electric valves to control the flow of gas or other form of power.

It is an object of this invention to provide a clock mechanism with a signal operated direct from the clock train and automatically restrained from operation until released by the train, without affecting the time train.

It is a further object to provide a novel and improved device which may be set to control a power circuit in a predetermined manner or at a predetermined future time or which may, as desired, be set to permit the circuit to be rendered inoperative to control said circuit.

It is a further object to provide a device of the character referred to which will automatically indicate when the predetermined operation has been completed and whether or not the device is arranged to be set for either automatic control.

It is a further object to provide a device in which an alarm device such as a switch alarm, a time alarm strike or chime may be operated direct from the clock train motor without interfering with the operation or time keeping qualities of the latter.

It is a further object to provide a new and improved signal mechanism for time switches and clocks.

It is a further object to provide a switch device of the character referred to in which a signal device for indicating when the predetermined operation has been completed may be automatically rendered inoperative when the device is set to be free from automatic control.

It is a further object to provide a drive for such a signal directly from the timing mechanism which may be conditioned to be inoperative when desired, without stopping the timing mechanism, and more specifically to drive such a signal from a continuously rotating part, and to disconnect it, or restrain its operation when its operation is not desired.

It is a further object to provide a device of the character described which will be simple in its construction and manipulation and reliable in its operation.

Other objects will in part be obvious and will in part appear hereinafter.

The invention accordingly comprises the features of construction, combinations of elements, and arrangements of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:—

Figure 1 is a front elevation of a device embodying this invention, certain of the operating parts being shown in dotted lines.

Figure 2 is a side elevation of the same device with the case removed and with the motor and main gears, which constitute the clock train, omitted for the sake of clarity.

Figure 3 is a perspective view showing the relationship of the audible signal and the visible signal, the main portion of the clock train being omitted for the sake of clarity.

Figure 4 is a fragmentary rear elevation showing the visible signal.

Figure 5 is a circuit diagram showing the circuit connections.

Figures 6 and 7 are front and side elevations of a modified construction.

Figure 8 is a detail thereof.

Figure 9 is an elevation of another modification.

Figure 10 is a side elevation thereof.

Within its broad scope, this invention, in many of its features, may be utilized in many different ways as will be readily understood. It has been particularly adapted, however, to the form of time control switch shown in our copending application Serial #421,689, and it is specifically illustrated as applied to a device of that kind, comprising generally a casing 10 enclosing a synchronously driven time train not shown, and driving hands 11, 12 and 13 over a clock face 14.

The clock mechanism in general is carried between two plates 15 and 16 which each are parallel and spaced apart by spacing members 17. The rear plate 18 of the casing 10 is preferably carried from the plate 15 through the medium of live rubber, as shown at 19, and similarly the face 14 is also preferably supported from the plate 16 by means of live rubber 20. The face 14 contains two auxiliary dials 21 and 22 over which move hands 23 and 24 which indicate the time at which the circuit is to be closed and opened respectively, as will be hereinafter described.

The circuit controller primarily comprises a set of contact fingers 25, 26, 27 and 28 carried by an insulating block 29. The fingers 25 and 26 extend to one side of said block and may be caused to make contact at the points 30. The fingers 27 and 28 extend to the other side of the block and are adapted to make contact at the points 31. The fingers 26 and 27 are connected together preferably comprising a single strip. In this manner a circuit is made between the fingers 25 and 28 only when both sets of contacts are closed.

One of these pairs of fingers, as for example, the fingers 27 and 28 are biased to remain open while the other set of contacts, as for example, 25 and 26, is biased to close.

Mounted with the time train and geared thereto is a pinion 35 which meshes with a gear 36. This gear 36 carries a snail cam 37 to cooperate with a pin 38 to constitute a timing element and the gear and cam are slidably and rotatably mounted upon a shaft 39 carrying the pin 38 in position to cooperate with the snail cam and carrying also the setting hand 24. A knob 40 may be used to rotate the shaft 39 and thereby change the position of the pin 38 and also the setting of the hand 24 to alter the time at which the snail cam cooperates with the pin 38.

The gear 36 is urged outwardly to cause the cam 37 to engage the pin 38 in any convenient manner, as for example through the medium of a spring plate 41, engaging the hub of the gear. This spring plate may conveniently have a projection 41a to hold the finger 28 in engagement with the finger 27 to complete the contact at 31. When the pin 38 releases the snail cam and permits the gear 36 and spring 41 to move axially toward the left, as shown in Figure 3, the spring arm 41a releases the contacts 27—28 and permits the circuit to snap open.

A similar timing wheel may be utilized to operate the fingers 25 and 26 except that the circuit snaps closed. In view of the fact that this construction is similar to that shown in the copending case and that it forms no specific detail of this invention, further illustration is not required.

This arrangement of the independently timed switch operations is particularly adapted to closing a circuit a predetermined time in the future and then, after a further predetermined time, causing it to open. For example, a housewife may prepare a meal and leave it on the stove or in the oven. The device may then be relied upon to turn on the heat a predetermined length of time before the dinner will be required and then turn it off again and announce the fact that dinner is ready.

It is desirable, that the housewife shall have control over whether the device shall be automatically time operated or under manual control. To this end mechanism is provided for discontinuing the automatic operation. To accomplish this result an auxiliary switch 45, see Figure 5, may be employed. This switch may be arranged either to short circuit the control contacts 25, 26, 27 and 28, thereby preventing them from opening the circuit, or the switch 45 may be placed in series with these fingers thereby preventing them from closing the circuit. In the first case it will be desirable to provide some means for opening the circuit at another point and in the latter instance it will be desirable to provide some means for closing the circuit through another channel.

Figure 5 shows a typical wiring diagram of the latter type in which the source of alternating current is diagrammatically illustrated by the terminals 46 and 47. A synchronous alternating current motor 48 is connected directly across the terminals 46 and 47 and is utilized to operate the electric clock which constitutes the timing device, and also to operate the audible signal when required. One of the terminals, as for example, 46 is connected to the switch 45 and to the contact points 31 and 30 in series and from thence through a wire 49 leading to a contact 50 of an outlet. The other contact 51 of the outlet is connected to the other terminal 47 and the device to be controlled, as for example the electric stove, is connected across the point 50—51.

With this construction it will be clear that with the switch 45 closed, the circuit to the translating device at 50—51 will be open so long as either of the contact points 30 or 31 is open. The timing mechanism, closes the contact 30 before the time desired for closing the circuit, the circuit being open at 31. The closing of the contact 31, therefore, completes the closing of the circuit at the time for which the hand 23 is set. This closes the circuit through the translating device and that circuit remains closed until the contact 30 is opened at the time for which the hand 24 is set.

If the switch 45 is opened, the sequence of operations of the contacts remains the same but it is without function since the circuit is open at the switch 45.

Mounted on a shaft 52 carried by the plates 15 and 16 is an arm 53 having at one end a knocker 54 which may conveniently be arranged to strike lightly against the casing 10 when the arm 53 is vibrated. This arm 53 carries a finger 55 in position to cooperate with a signal operating mechanism 56 upon a shaft 57 continuously driven by the time train as through the medium of the gear 58. This signal operating device may conveniently be in the form of a wheel having projections such as ratchet teeth 60 to engage the finger 55 and a spring 61 may be employed to urge the finger 55 into engagement with the ratchet teeth 60 whereby as the shaft 57 rotates, the arm 53 is rocked back and forth causing the knocker 54 to strike the casing as above described.

The arm 53 is provided with a second finger 62 and the gear 36 is provided with an enlarged conical hub 63 so arranged that at one extreme of the axial movement of the gear 36 the hub 63 will engage the finger 62 and hold the lever 53 at one side, preventing engagement between the finger 55 and the ratchet 60. When, however, the gear 36 is at the other extreme of its axial movement, the enlarged hub 63 no longer interferes with the movement of the finger 62 and hence does not interfere with the movement of the knocker.

With this construction, it will be clear that when the time gear 36 reaches the predetermined time for which the device is set and moves axially as the finger 38 slips off the edge of the snail cam, the circuit is opened at the point 31 and simultaneously the knocker 54 is freed by the hub 63 and is oscillated back and forth by the ratchet teeth 60. This knocker, therefore, serves as a signal to indicate when the circuit has been opened at the point 31.

An arm 65 carrying a conspicuous signal 66 is pivoted upon a shaft 67 attached to the plate 16 to swing from a position behind the casing to a conspicuous position at the side. This arm may have an opening 68 to engage the lever 69 of the switch 45 whereby as the signal 66 is moved about its shaft 67, it opens and closes the switch 45. This is a convenient arrangement as it makes it possible to utilize a standard commercial switch. The shaft 67 carries a pin 70 which, during the operating movement of the switch and signal, moves into and out of engagement with an arm 71 upon the shaft 52.

The relative position of this signal and switch is such that when the signal is upright and concealed by the casing, as viewed from the front, the switch 45 will be open and the pin 70 will obstruct the movement of the arm 71 and of the knocker 54. In this position of the parts, the instrument serves as a clock only, without any form of automatic control, and although the contacts will be opened and closed at the points 30 and 28 automatically once each 12 hours, this is without function so long as the automatic action is not desired.

Should it be desired, however, to secure the automatic operation, the hands 23 and 24 are set to the times at which it is desired to have the circuit closed and opened and then the signal 66 is moved in a clockwise direction, see Figure 1, thereby indicating that the device is under automatic control and at the same time closing the switch 45 and thereby making the automatic control effective.

The constructions shown in Figures 6 to 10 are also adapted to drive the signal from the continuously driven mechanism, but in these two modifications, for convenience of illustration, the invention is embodied in a device which does not have the circuit controlling features, although obviously it is applicable to a time controlled switch.

In the construction of Figures 6 and 7 the numeral 80 designates the clock motor, shown here as a synchronous electric motor which is geared in the usual manner to train gears 81, 82, 83 and 84 and through other gears not shown, to hands also not shown.

An arm 85 pivoted at 86 through the medium of a spring 87 carries a knocker positioned to engage a ball or other sounding device 88. Fixed to the arm 85 is a tooth 90 positioned slidingly to engage the teeth 91 of the gear 82 or of a ratchet gear carried thereby whereby as the gear rotates, the arm 85 is moved back and forth as the tooth slips over the gear teeth 91.

A bell crank lever 92 pivoted at 93 has an arm 94 positioned so that it may engage the arm 85 and hold the latter and the tooth 90 away from the teeth 91. The other arm 90′ of the bell crank lever is adjacent to the shaft 96 of the gear 84. This gear 84 is loose upon its shaft and is movable axially thereon, its position being determined by a leaf spring 97 and a cam 98 fixed to the gear 84 and cooperating with a pin 99 carried by the shaft 96. The gear 84 has a conical hub 99′ adapted to restrain or release the arm 95 in the same way that the hub 63 engages the arm 62 in the previous modification.

A second bell crank lever 101 pivoted at 102 has one arm 102ª adapted to engage the arm 85 to restrain its operation and the other arm 103 adapted to serve as a manual control.

With this construction it will be obvious that when the cam 98 releases the pin 99, the arm 95 will permit the signal to operate as the tooth 90 rides over the teeth 91.

In the construction of Figures 9 and 10, the knocker comprises a series of hammer elements 106, rotatably mounted upon the arms 107 of a spider 108, journalled in the free end of pivoted lever 109 at 109′. These hammer elements are pinned to the spider arms by pins 110 but the holes in the elements through which the pins pass are large compared to the pins.

The lever 109 is pivoted to the main frame at 112 and is oscillatable to move a pinion 113, carried by the spider 108, into and out of mesh with the gear 82 of the clock train. A spring 114 urges the pinion 113 and gear 82 into mesh.

The time wheel gear 115 journalled on shaft 116 corresponds to gear 84 and shaft 96 except that the axial movement of the gear 115 in response to the snail cam, bears against a leaf spring 117 which has a down turned end 118 having an inclined surface 119. This spring is so designed that when the time cam of the wheel 115 is set, the end 118 of the spring 117 engages an arm 120 rigid with the arm 109 and holds the pinion 113 out of engagement with gear 82; but so that when the time cam is released, the pinion 113 actuated by spring 114 is drawn into mesh to drive the spider 108 from the gear 82.

A manual lever 121 is used to engage the arm 109 and hold it out of engagement when desired.

The operation of these two modifications will be obvious from the above description.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:—

1. A time switch for controlling a circuit comprising a synchronous motor, a switch device connected in said circuit, means for connecting said device to the motor for opening and closing the switch device at timed intervals, an audible signal, means operated by the synchronous motor for driving the signal, means operated by the said operation of the switch connecting means for disconnecting said signal from the signal driving means and releasable to permit the signal to be operated when the switch device is opened, a master switch for disconnecting the switch device from the circuit and means controlled by the operation of the master switch for restraining connection between said signal and said signal driving means.

2. A device of the character described for controlling an external circuit comprising in combination a synchronous motor, a time train continuously driven thereby, inlet and outlet electric terminals, one of said inlet terminals being connected to one of said outlet terminals and to said motor, and the other of said inlet terminals being connected to said motor and connected to another of said outlet terminals by a circuit containing three switches in series, two of said switches including means operated by said motor and independently settable to close one of said switches and open another at predetermined future times, and manual means for opening the third switch, an audible signal, means for operating said signal from said synchronous motor and means controlled by the operating mechanism of one of the time controlled switches to prevent operation of the signal when said one switch is closed and means controlled by the third switch to prevent operation of the signal when the third switch is open.

3. A device of the character described for controlling an external portion of a circuit comprising in combination, an internal portion of a circuit for connecting said external portion of a circuit to a source of current, a continuously operating timing mechanism driven by a synchronous motor, a circuit controlling device including an element actuated by said timing mechanism and settable to instigate the opening of said internal portion of a circuit, an audible signal and means actuated by the actuation of said controlling device to open said circuit, for connecting said signal to said motor to be operated thereby, manual means for disconnecting said signal from said motor, a switch for rendering the device ineffective to control the external portion of a circuit, and means for operating said switch from said disconnecting means.

4. A device of the character described for controlling an external portion of a circuit comprising in combination, an internal portion of a circuit for connecting said external portion of a circuit to a source of current, a continuously operating timing mechanism driven by a synchronous motor, a circuit controlling device including two elements actuated by said timing mechanism and independently settable to instigate the closing and opening of the internal portion of a circuit, an audible signal and means actuated by the actuation of said controlling device to open said circuit, for connecting said signal to said motor to be operated thereby.

5. A device of the character described for controlling an external portion of a circuit comprising in combination, an internal portion of a circuit for connecting said external portion of a circuit to a source of current, a continuously operating timing mechanism driven by a synchronous motor, a circuit controlling device including two elements actuated by said timing mechanism and independently settable to instigate the closing and opening of the internal portion of a circuit, an audible signal and means actuated by the actuation of said controlling device to open said circuit, for connecting said signal to said motor to be operated thereby, manual means for disconnecting the signal from the motor, a switch for rendering the device ineffective to control the external portion of a circuit and means for operating said switch from said disconnecting means.

6. A device of the character described for controlling an external portion of a circuit comprising in combination, an internal portion of a circuit for connecting said external portion of a circuit to a source of current, a continuously operating timing mechanism driven by a synchronous motor, a circuit controlling device including two elements actuated by said timing mechanism and independently settable to instigate the closing and opening of the internal portion of a circuit, an audible signal and means actuated by the actuation of said controlling device to open said circuit, for connecting said signal to said motor to be operated thereby, manual means for stopping the signal, a switch connecting said device to the external portion of a circuit, and means operated by the operation of said stopping means for opening said switch to render the device ineffective to control the external portion of a circuit.

7. A time switch for controlling an electric circuit, including a synchronous clock, a switch device connected to said circuit, and time controlled by the synchronous clock to close and open at regular intervals, an audible signal, operating means driven by said synchronous clock for said signal, conditionable for operation by the operating mechanism of the time controlled switch device to open the circuit, a master switch connected to render the time controlled switch ineffective to control the circuit, and means operated by the operating mechanism of the master switch to disconnect the audible signal from its operating means when the master switch has rendered the time controlled switch ineffective to control the circuit.

8. A time switch for controlling an electric circuit, including a synchronous clock, a switch device connected to said circuit, and time controlled by the synchronous clock to close and open at regular intervals, a toothed wheel continuously driven by said motor, an audible signal having a lever for engaging said wheel, means operated by the operating mechanism of the switch device for preventing engagement of said lever with said wheel while said switch device is closed, a master switch connected to render the time controlled switch ineffective to control the circuit, and means operated by the operating mechanism of the master switch to disconnect the audible signal from its operating means when the master switch has rendered the time controlled switch ineffective to control the circuit.

9. A time switch for controlling an electric circuit, including a synchronous clock, a switch device connected to said circuit, and time controlled by the synchronous clock to close and open at regular intervals, a toothed wheel continuously driven by said motor, an audible signal having a lever for engaging said wheel, means operated by the operating mechanism of the switch device for preventing engagement of said lever with said wheel while said switch device is closed, a master switch connected to render the time controlled switch ineffective to control the circuit, a flag movable from a concealed position to an exposed position to open said master switch, and means operated by said flag to disconnect the audible signal from its operating means when the master switch has rendered the time controlled switch ineffective to control the circuit.

RICHARD H. WHITEHEAD.
WILSON E. PORTER.